(12) United States Patent
Kim

(10) Patent No.: US 8,716,978 B2
(45) Date of Patent: May 6, 2014

(54) CHARGING METHOD AND APPARATUS FOR ELECTRIC VEHICLE

(75) Inventor: Ki Seok Kim, Daegu (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 307 days.

(21) Appl. No.: 13/329,643

(22) Filed: Dec. 19, 2011

(65) Prior Publication Data
US 2012/0161702 A1 Jun. 28, 2012

(30) Foreign Application Priority Data
Dec. 23, 2010 (KR) ........................ 10-2010-0134023

(51) Int. Cl.
*H02J 7/00* (2006.01)
(52) U.S. Cl.
USPC .......................................... 320/109; 180/65.1
(58) Field of Classification Search
USPC ....................... 320/109, 107; 180/65.1, 65.21; 307/10.1
See application file for complete search history.

(56) References Cited

U.S. PATENT DOCUMENTS

| | | | |
|---|---|---|---|
| 5,548,200 A * | 8/1996 | Nor et al. .................... | 320/109 |
| 6,104,160 A * | 8/2000 | Iwata et al. .................. | 320/103 |
| 6,680,547 B1 * | 1/2004 | Dailey ........................... | 307/31 |
| 6,766,874 B2 * | 7/2004 | Naito et al. ................. | 180/65.26 |
| 7,256,516 B2 * | 8/2007 | Buchanan et al. ............. | 307/62 |
| 2004/0078655 A1 * | 4/2004 | Sung .............................. | 714/14 |
| 2005/0110460 A1 * | 5/2005 | Arai et al. ..................... | 320/116 |
| 2007/0221422 A1 * | 9/2007 | Rosenstock .................. | 180/65.3 |
| 2009/0229900 A1 | 9/2009 | Hafner et al. | |

FOREIGN PATENT DOCUMENTS

| | | |
|---|---|---|
| JP | 2009-118652 A | 5/2009 |
| JP | 2009-254052 A | 10/2009 |
| KR | 1020100079338 A | 7/2010 |

* cited by examiner

*Primary Examiner* — Yalkew Fantu

(57) ABSTRACT

Disclosed are a charging apparatus and a charging method for a battery of an electric vehicle. The charging apparatus for a battery of an electric vehicle includes: a communication module that communicates power information and information on a battery of the electric vehicle; a charging mode setting module that receives a user's order; a charging switch that connects the battery of the electric vehicle with the charging power in accordance with an input control signal; and a charging control module that sets the charging amount of the battery by using the power information and the information on the battery, sets charging information including charging power and at least one time period for charging the battery of the electric vehicle within a predetermined time range, and input the control signal to the charging switch on the basis of the charging information.

20 Claims, 3 Drawing Sheets

FIG. 1
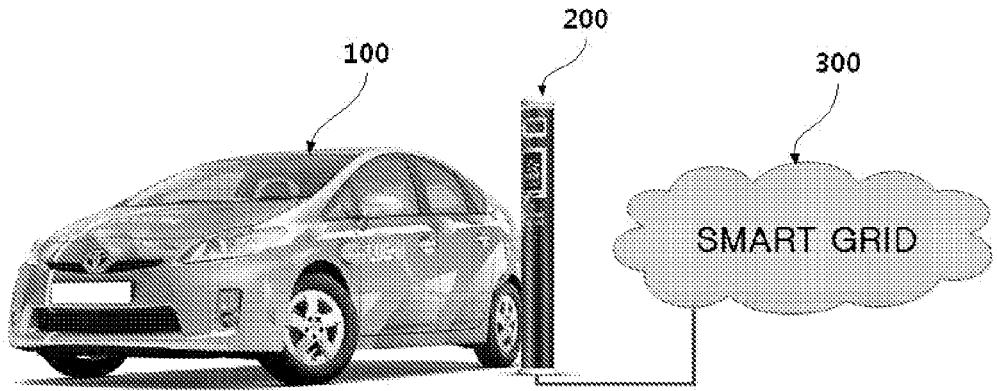
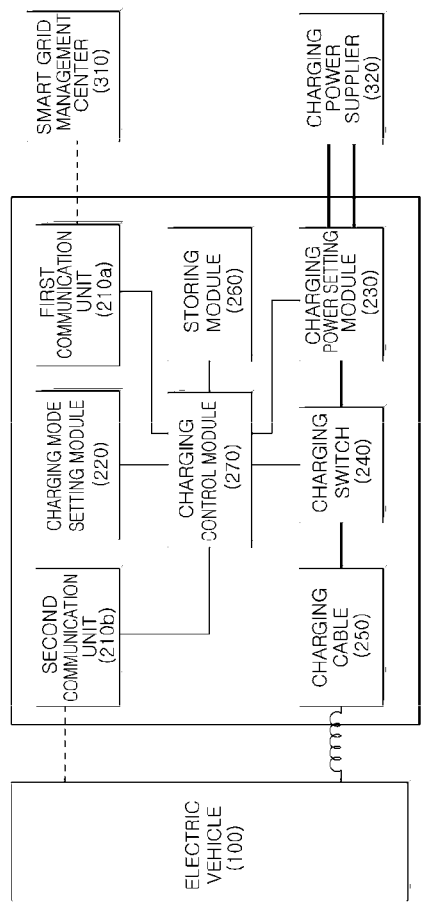
FIG. 2

| | CHARGING POWER RATE PER TIME: WON/1KWH ||||||| 
| | CHARGING TIME |||||||
| | PM 8 | PM 9 | PM 10 | PM 11 | AM 1 | AM 2 | · |
| ENERGY SOURCE A | 10 | 15 | 8 | 9 | 5 | 5 | · |
| ENERGY SOURCE B | 20 | 13 | 5 | 7 | 7 | 7 | · |
| CHARGING POWER SUPPLIER | A | B | B | B | A | A | · |

CHARGING METHOD AND APPARATUS FOR ELECTRIC VEHICLE

CROSS-REFERENCE TO RELATED APPLICATIONS

This application claims priority to and the benefit of Korean Patent Application No. 10-2010-0134023 filed in the Korean Intellectual Property Office on Dec. 23, 2010, the entire contents of which are incorporated herein by reference.

TECHNICAL FIELD

The present invention relates to an apparatus and a method of charging a battery of an electric vehicle, and more particularly, to an apparatus and a method of charging a battery of an electric vehicle that charge a battery of an electric vehicle on a smart grid.

BACKGROUND

Recently, as issues concerned with the environment and energy resources become important, electric vehicles and plug-in hybrid vehicles have been spotlighted as future transportation to solve the issues.

Although power for charging the batteries in the existing hybrid electric vehicles was supplied by a regenerative brake and operating a power generator by the engine, electric vehicles and plug-in hybrid vehicles can be supplied with power for charging the batteries of the electric vehicles from a national grid or a decentralized power supply.

On the other hand, when the electric vehicles and plug-in hybrid vehicles are used for commuting, a pattern of driving the vehicles in the morning and charging the batteries in the evening has an adverse effect on the national grid or the decentralized power supply and increases the highest power consumption of the entire grid at a specific period of time.

This is set to the highest power consumption, but if more power is used, the present power system with a reserve rate of about 10% requires additional equipment for power generation and a large amount of electricity is wasted, thereby reducing energy efficiency.

Therefore, recently, a smart grid system that makes the grid intelligent has been constructed to increase energy efficiency and reduce energy consumption and bilateral horizontal supply systems, such as a microgrid and a decentralized power supply method, have been implemented, coming out of the vertical system that one-sidedly supplies electricity from the central station.

The core of the smart grid system is that consumers and a power company communicate information in real time by combining the grid with an information and communication technology, such as ZigBee or power line communication, which makes it possible to use electricity and automatically operates devices at a period of time with low electric charges.

However, there is a problem in that the existing charging equipment of electric vehicles immediately charge the batteries regardless of the electric charges and this has a considerable adverse effect on the national grid or the decentralized power supply, such that it is difficult to use electricity for charging the batteries of the electric vehicles at low cost.

SUMMARY

The present invention has been made in an effort to provide an apparatus and a method of charging batteries in electric vehicles, which charges batteries of electric vehicles at a period of time having the lowest charging power rate.

An exemplary embodiment of the present invention provides a charging apparatus for a battery of an electric vehicle, including: a communication module that communicates power information including power rates for times and information on a battery of the electric vehicle; a charging mode setting module that receives a user's order relating to a charging mode of the battery of the electric vehicle; a charging switch that connects the battery of the electric vehicle with the charging power in accordance with an input control signal; and a charging control module that sets the charging amount of the battery by using the power information and the information on the battery, sets charging information including charging power and at least one time period for charging the battery of the electric vehicle with the lowest charging power rate on the basis of the charging power rates for unit times within a predetermined time range, and input the control signal to the charging switch on the basis of the charging information.

The charging control module may control the charging switch to charge the battery in any one, which is selected by a user's input, of an eco-charging mode that charges the battery of the electric vehicle at the charging time period having the lowest charging power rate within a predetermined time range, a fast charging mode that charges the battery of the electric vehicle by using high pressure within a short time, a full charging mode that fully charges the battery of the electric vehicle, and a smart charging mode that restricts the charging capacity of the battery to improve the performance of the battery of the electric vehicle.

The charging control module may set a charging mode with a combination of two or more modes.

When the present time reaches the charging time period, the charging control module may ascertain the charging state of the battery of the electric vehicle, and when charging is possible, supply charging power to the battery of the electric vehicle by controlling the charging switch.

The charging control module may periodically check the charging state of the battery of the electric vehicle in charging, and when the battery of the electric vehicle has been fully charged, completely charged, or in an unstable state, and the present time is the charging-end time, may finish the charging by turning off the charging switch.

The charging apparatus for a battery of an electric vehicle may include a charging power setting module that selects charging power supplied to the battery of the electric vehicle.

The charging power setting module may supply charging power to the battery of the electric vehicle by selecting a charging power supplier in accordance with the charging fee inputted in accordance with a control signal of the charging control module.

The charging mode setting module may receive a user's order for setting a charging limit time for the battery of the vehicle.

The charging power supplier may use the charging power stored in the battery of an electric vehicle or a plug-in hybrid electric vehicle.

The charging apparatus may further include a storing module that stores the power information, the information on the battery of the electric vehicle and the charging mode set by the user.

The power information may includes at least any one of an energy source, the date, and power rates for time periods.

Another exemplary embodiment of the present invention provides a charging method for a battery of an electric vehicle, including: a step of setting the charging amount for a battery of an electric vehicle by using power information received from a smart grid management center in a predetermined time range, a charging mode that a user sets, and information on the sate of the battery; a step of calculating charging information by calculating at least one time period for charging the battery of the electric vehicle with the lowest charging power rate on the basis of charging power rates for unit time periods; a charging control step that provide charging power for inputting a control signal to a charging switch to charge the battery of the electric vehicle at the time period having the lowest charging power rate on the basis of the time period; and a connection step that connects the battery of the electric vehicle with power of a charging power supplier in accordance with the input control signal, by using the charging switch.

The charging method may further includes: a step that sets a user's preferring charging mode from one of or a combination of an eco-charging mode that charges the battery of the electric vehicle at the charging time period having the lowest charging power rate within a predetermined time range, a fast charging mode that charges the battery of the electric vehicle by using high pressure within a short time, a full charging mode, and a smart charging mode that restricts the charging capacity of the battery to improve the performance of the battery of the electric vehicle, before the step of calculating. The charging method may further include: a step that determines whether the present time is a charging start time, and ascertains the state of the battery when the present time is the charging start time, and sets charging power, if necessary, when charging is possible; and a step that turns on the charging switch to supply the charging power to the battery of the electric vehicle from the selected charging power.

The charging method may further include a step of turning off the charging switch for supplying the charging power to the battery of the electric vehicle when the battery is fully charged, completely charged, or in an unstable state by periodically checking the state of the battery in charging, and when the present time is a charging-end time.

The charging method may further include: a step of performing a process of ascertaining the identification number of the electric vehicle simultaneously with setting the start of charging of the battery of the electric vehicle; and a step of starting to charge the battery of the electric vehicle through a user identification process that ascertains the identification number of the electric vehicle.

The charging method may further include a step of supplying charging power to the battery of the electric vehicle by selecting a charging power supplier in accordance with the charging fee inputted in accordance with a control signal of the charging control module.

The charging method may further include: a charging power selection step that supplies charging power from a plurality of charging power suppliers or sets charging power for supplying variable charging power using variable current or variable voltage; a charging power calculation step that sets charging information by calculating the optimum charging power and at least one time period for charging the battery of the electric vehicle with the lowest charging power on the basis of charging power rates for unit times acquired from power information within a predetermined time range; a charging control step that provides charging power for inputting a control signal to the charging switch and sets charging power to charge the battery of the electric vehicle at the time period having the lowest charging power rate on the basis of the time periods; and a connection step that connects the charging power with the battery of the electric vehicle in accordance with the input control signal by using the charging switch.

The charging method may further include a variable charging power selection step that selects at least any one of the variable voltage and the variable current.

The charging method may further include a step of setting the charging amount for the battery of the electric vehicle by receiving the charging mode from the electric vehicle.

According to exemplary embodiments of the present invention, it is possible to charge the battery of an electric vehicle at low cost by calculating the order of times corresponding to the charging power rates according to the charging amount of the battery of the electric vehicle for unit charging time periods within time information set by the user using the power information, and charging the battery of the electric vehicle in the order of times with the lowest charging power rate on the basis of time information set by the user.

According to exemplary embodiments of the present invention, it is possible to maximize energy use efficiency of the national grid or the decentralized power supply by charging the battery of the electric vehicle with a charging power supplier at the lowest fee, when a plurality of charging power suppliers is provided.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a view showing a charging apparatus for a battery of an electric vehicle according to an exemplary embodiment of the present invention.

FIG. 2 is a block diagram showing a charging apparatus for a battery of an electric vehicle according to an exemplary embodiment of the present invention.

Figures 3, 4:
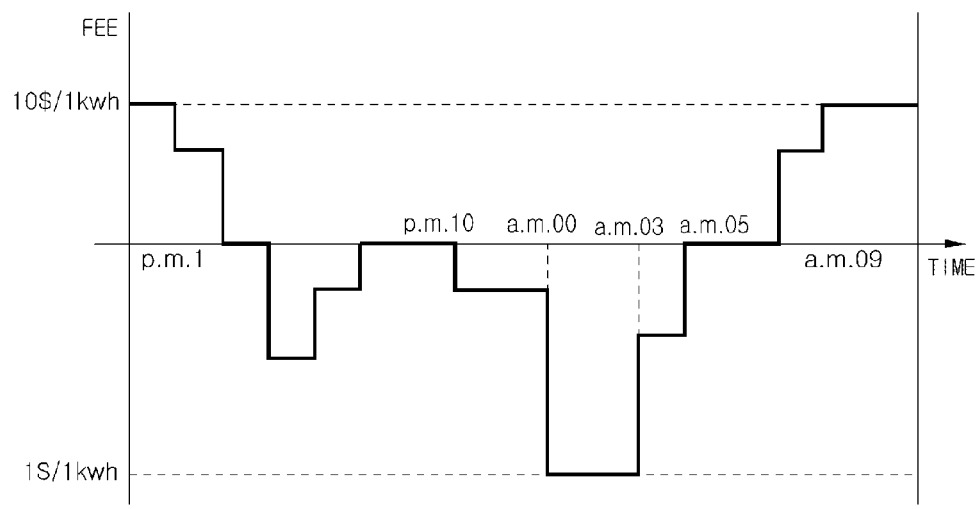
FIG. 3 is a reference diagram illustrating energy prices for smart grid time periods according to an exemplary embodiment of the present invention.
FIG. 4 is a reference diagram illustrating setting of a plurality of charging power suppliers for time periods according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

FIG. 1 is a view showing a charging apparatus for a battery of an electric vehicle according to an exemplary embodiment of the present invention.

Referring to FIG. 1, a charging apparatus 200 for a battery of an electric vehicle supplies charging power to a battery in an electric vehicle, using a charging cable 250.

The charging apparatus for a battery of an electric vehicle may supply charging power to the battery in an electric vehicle, using an on-line inductive power supply method and it is possible to construct an eco-friendly system without a danger due to disconnection and electric contact by supplying power in a non-contact inductive power supply method on the ground.

The charging apparatus 200 for a battery of an electric vehicle receives power information transmitted from a smart grid 300, using communication equipment.

The communication equipment may be implemented by power line communication, broadband communication, Zig-Bee optical communication, and serial data communication.

The electric vehicle 100 is an example of EVs (Electric Vehicles) that use the power of the charged battery in the electric vehicle as a driving power source, and which includes a PHEV (Plug-in Hybrid Electric Vehicle) that uses both an internal combustion engine and a battery as driving power sources. The electric vehicle 100 is synchronized with the charging apparatus 200 for a battery of an electric vehicle.

The smart grid 300, a power system where a provider and a consumer interact with each other, using an information and communication technology when electricity is generated, carried, and consumed, includes a smart grid management center 310 that creates power information and a charging power supplier 320 that provides power required for a battery of an electric vehicle.

The power information includes information that allows the power provider and a consumer to interact with each other, including the energy source, the date, and the power rates for periods of time.

The charging apparatus 200 for a battery of an electric vehicle according to an exemplary embodiment of the present invention can receive power in connection with the national centralized grid or a decentralized power supply, and can store electricity by charging a battery with midnight idle power at night and receive power in the day time.

FIG. 2 is a block diagram showing a charging apparatus for a battery of an electric vehicle according to an embodiment of the present invention.

The charging apparatus 200 for a battery of an electric vehicle supplies charging power for a battery of an electric vehicle and includes a communication module 210, a charging mode setting module 220, a charging power setting module 230, a charging switch 240, a charging cable 250, a storing module 260, and a charging control module 270.

In detail, referring to FIG. 2, the communication module 210 includes a first communication unit 210a that communicates information with the smart grid management center 310 and a second communication unit 210b that communicates the information on the electric vehicle with the electric vehicle 100.

Although the communication module 210 is divided, it may be implemented in an integrated module.

The charging mode setting module 220 allows a user to set a preferring battery charging mode of the electric vehicle and includes a fast charging mode that performs charging, using high pressure within a short time, depending on the power for charging the battery of the electric vehicle and an eco-charging mode that is selected to charge the battery of the electric vehicle in a period of time having the lowest power rate within time information set by the user.

The charging mode setting module 220 may include a full-charging mode that fully charges the battery of the electric vehicle and a smart mode that restricts the charging capacity of the battery to extend the performance of the battery of the electric vehicle.

The charging mode setting module 220 may set one charging mode or a combination of a plurality of charging modes.

The user can set a charging time limit for the electricity supplied to the battery of the vehicle in all charging modes.

For example, the charging time limit may be set within 10 hours or before going to work the next morning.

Meanwhile, the charging mode can be received from the information on the vehicle.

The charging power setting module 20 selects charging power when various power suppliers are provided or the charging power is variably supplied.

The charging power setting module 230 can supply charging power to the battery of the electric vehicle by selecting a charging power supplier in accordance with the charging fee inputted in accordance with a control signal of the charging control module.

When a plurality of charging power supplier is provided, it is possible to provide charging power by selecting a charging power supplier for a desired fee in accordance with the signal of the control module and supply variable power using a variable voltage and variable current into the charging power in accordance with the control signal.

In detail, the variable voltages are 220V and 120V and the variable currents are 10 A, 20 A, and 100 A, which are selectively supplied in consideration of the charging mode and the status of the battery.

The charging power supplier includes the power plant of the power company, a micro-grid, and a decentralized power supply, and the charging power stored in the battery of an electric vehicle or a plug-in hybrid vehicle ma be used as power supplier.

The charging power supplier may be V2G (Vehicle-To-Grid) that uses the charging power stored in the battery of an electric vehicle or a plug-in hybrid electric vehicle.

The charging switch 240 connects the charging power with the battery of the electric vehicle in accordance with an input control signal and supplies the charging power to the battery of the electric vehicle through the charging cable 250.

The storing module 260 stores power information, and battery information and battery charging information of the electric vehicle.

The charging control module 270 sets a required charging amount, using the information on the battery, the charging mode, and the power information, calculates at least one period of time for charging the battery of the electric vehicle having the lowest charging power rate, using the power information, within a predetermined time range, and input the control signal to the charging switch to charge the battery of the electric vehicle at the period of time having the lowest charging power rate on the basis of the period of time.

The charging control module 270 sets the charging power in the calculating of the period of time and controls the charging switch 240 after setting the charging power in the control process, when various levels of charging power are provided.

In detail, referring to FIG. 3 or FIG. 4, the function of charging a battery of an electric vehicle of the charging control module 270 is described.

The charging control module 270 first sets the required charging amount for the battery of the vehicle, using the power information, the information on the battery of the electric vehicle, and the user's preferring charging mode. It calculates the unit cost of power per unit time from the following Formula 1.

$$\text{Price}(i, t) = \frac{\text{PRICE OF } P(I, T), T)}{P(i, t)} \quad \text{(Formula 1)}$$

$P(i, t)$: POWER $0 \leq i \leq n(n = \text{POWER SOURCE})$ $0 \leq t \leq T(T = \text{TIME SET BY USER})$ where Price (i.t) for calculating the unit cost of power per unit time should satisfy a time limit condition set by the user or set as a default value and charging information including at least one, the most efficient period of time where the entire power satisfies the charging amount set by the charging mode while adding up P (i, t) from the lowest unit cost is set.

For example, when the charging amount of 30 kwh for the battery of the electric vehicle is required and the user sets the charging time within 8 hours or till the going-to-work time, the charging control module 250 calculates 0 A.M. to 3 A.M., which is periods of time corresponding to the lowest charging power rate, and stores the periods of time as charging information.

The charging control module 270 charges the battery of the electric vehicle by controlling the charging switch between A.M 0 and A.M. 3 having the lowest charging power rate.

Meanwhile, when the charging amount of 40 kwh for the battery of the electric vehicle is required, it sets 0 A.M. to 3 A.M. and 4 A.M. to 5 A.M. as the charging information and charges the battery of the electric vehicle.

Meanwhile, when a plurality of charging power suppliers are provided, as shown in FIG. 4, the charging control module 270 calculates the charging power unit cost of the energy source A and the energy source B within the time information set by the user and selects and sets the charging power supplier having the lowest charging power rate as charging information.

For example, when a charging amount of 30 kwh for a battery of an electric vehicle is required, the charging control module 270 charges the battery with the energy source B in the time bands of 10 p.m. and 11 p.m. with the lowest charging power rate for each charging unit time period, and charges the battery of the electric vehicle with the energy source A in the time bands of 1 a.m. and 2 a.m.

The energy sources A and B include a decentralized power supply, such as a fuel cell, wind power, or sunlight, and includes a charging power supplier storing midnight electricity in a specific battery.

For example, when power generation of sunlight is supplied, the battery of the electric vehicle can be charged by the sunlight power during the daytime and can be charged by the midnight power at night which is supplied through a centralized grid.

The charging power supplier can supply variable power and the charging control module 270 can provide a smart charging method for extending the lifespan of the battery by performing charging by variably supplying the charging power supplied from a specific power supplier in consideration of efficiency and the battery state, in which it is possible to calculate and store optimal charging power, in addition to the power source, in the charging information, and the charging power setting unit can variably provide and use the charging power.

The charging control module 270 ascertains first the battery state when it is necessary to start charging by comparing the charging time period stored in the charging information with the present time, determines whether charging is possible, and when charging is possible, charges the battery of the electric vehicle by operating the charging switch 240.

The charging control module 270 can control the charging switch 240 to charge the battery in any one, which is selected by a user's input, of an eco-charging mode that charges the battery of the electric vehicle at the charging time period having the lowest charging power rate within a predetermined time range, a fast charging mode that charges the battery of the electric vehicle by using high pressure within a short time, a full charging mode that fully charges the battery of the electric vehicle, and a smart charging mode that restricts the charging capacity of the battery to improve the performance of the battery of the electric vehicle.

The charging control module 270 can set a charging mode with a combination of two or more modes.

When the present time reaches the charging time period, the charging control module 270 ascertains the charging state of the battery of the electric vehicle, and when charging is possible, it can supply charging power to the battery of the electric vehicle by controlling the charging switch.

The charging control module 270 periodically checks the charging state of the battery of the electric vehicle in charging, and when the battery of the electric vehicle has been fully charged, completely charged, or in an unstable state, and the present time is the charging-end time, it can finish the charging by turning off the charging switch.

The charging control module 270 periodically checks the charging state of the battery of the electric vehicle in charging, and finishes the charging by turning off the charging switch when the battery of the electric vehicle has been fully charged, is in a complete charging state where the set charging amount is satisfied, or is in an unstable state.

The charging control module 270 finishes the charging by turning off the charging switch when the present time is the charging-end time by comparing the present time with the charging time period stored in the charging information, in charging.

As described above, a user can charge the battery having the lowest fee within the time information that the user sets.

Figure 5:
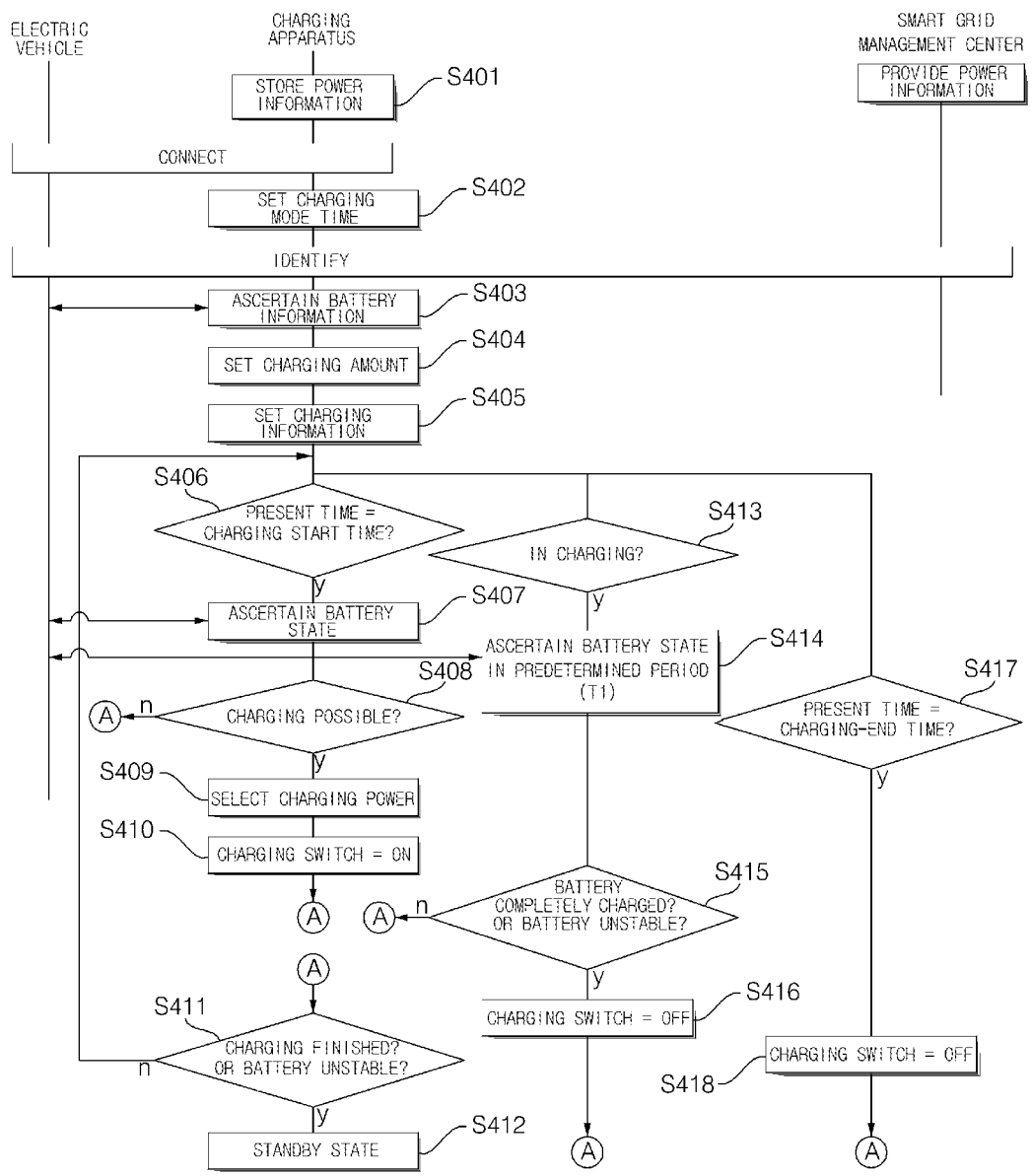
FIG. 5 is a flowchart illustrating a charging method for a battery of an electric vehicle according to an exemplary embodiment of the present invention.

Next, a method of charging the battery of an electric vehicle with the charging apparatus 200 for a battery of an electric vehicle is described. FIG. 5 is a flowchart illustrating a charging method for a battery of a vehicle according to an exemplary embodiment of the present invention.

First, power information is received from the smart grid management center 310 and stored in the storing module 240 (S401).

The user sets the state of connection with a charger to charge the battery of the electric vehicle. This generally means the start of charging through cable connection.

A preferring charging mode for charging the battery of the electric vehicle which is connected to the charging cable is set (S402).

In step S402, it is possible to select the eco-charging mode that charges the battery of the electric vehicle at the charging time period having the lowest charging power rate within a time range that is set by a user or set in advance and the fast charging mode that charges the battery of the electric vehicle, using high pressure, within a short time while it is possible to set one or two or more preferring combination of charging modes, including the full charging mode that fully charges the battery of the electric vehicle and the smart charging mode that restricts the charging capacity of the battery to improve the performance of the battery the electric vehicle.

In step S402, the charging mode can be manually set by the user and can receive charging mode information that the user wants from the information on the vehicle.

Meanwhile, in general, the charging control module 270 sets the start of charging the battery of the electric vehicle and simultaneously ascertains the identification number of the electric vehicle, and starts to charging the battery of the electric vehicle through the identification process of the user.

The contract relationship for power supply is synchronized with the smart grid management center by using the identification number of the electric vehicle and may be used to specifically charge exclusive vehicle charging fee.

The identification process may be omitted when a specific payment method is used, which may be set by a credit card or a mobile phone.

Next, the battery information of the electric vehicle is received from the electric vehicle and the type and charging state of the battery of the electric vehicle are ascertained (S403), and the charging amount of the battery of the electric vehicle, considering the charging mode required by the user and efficient use of the battery, is set (S404).

Charging information is set by calculating at least a time period and the charging power, if necessary, for charging the battery of the electric vehicle having the lowest charging power rate on the basis of the charging power rates for the unit time period acquired from the power information within a predetermined time range (S405).

The charging apparatus operates as follows after the charging information is set. It is determined that the present time is the charging start time (S406), and when they are the same, the state of the battery of the electric vehicle is ascertained (S407), and when charging is possible, resulting from determining whether charging is possible (S408), the charging switch is turned on to supply the charging power to the battery of the electric vehicle (S410).

If necessary, the charging power is set with the charging power setting module (S409) and the charging switch is turned on (S410).

In charging after step S405, the state of the battery of the electric vehicle is periodically ascertained from the electric vehicle (S414). Full charging, complete charging, or an unstable state of the battery is ascertained by ascertaining the state of the battery of the electric vehicle in step S414 (S415).

When full charging, complete charging, or the unstable state is determined in step S415, the charging switch is turned off to stop the supply of the charging power for the battery of the electric vehicle (S416).

Meanwhile, the charging switch is turned off to stop the supply of the charging power to the battery of the electric vehicle (S418) when the present time is the charging-end time, as a result of ascertaining whether the present time is the charging-end time (S417) after step S405.

Finally, when it is determined that it is the full charging or charging at the level that the user requests is completed in step S411, the charging of the battery is completely finished when the battery state is unstable, and the processes are repeated when the charging time period of the charging information is divided into several time periods.

The present invention relates to a charging apparatus for a battery of an electric vehicle and can be applied to electric vehicles that use charging power for a battery of an electric vehicle as a driving source, including plug-in hybrid vehicles, an electric charging station equipped with a smart grid, and an electricity-for-home charging station.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A charging apparatus for a battery of an electric vehicle, comprising:
    a communication module that communicates power information including power rates for times and information on a battery of the electric vehicle;
    a charging mode setting module that receives a user's order relating to a charging mode of the battery of the electric vehicle;
    a charging switch that connects the battery of the electric vehicle with the charging power in accordance with an input control signal; and
    a charging control module that sets a charging amount of the battery by using the power information and the information on the battery, sets charging information including charging power and at least one time period for charging the battery of the electric vehicle having a lowest charging power rate on the basis of the charging power rates for unit times within a predetermined time range, and inputs the control signal to the charging switch on the basis of the charging information.

2. The charging apparatus for a battery of an electric vehicle of claim 1, wherein the charging control module controls a charging switch to charge the battery in any one, which is selected by a user's input, of an eco-charging mode that charges the battery of the electric vehicle at a charging time period having the lowest charging power rate within a predetermined time range, a fast charging mode that charges the battery of the electric vehicle by using high pressure within a short time, a full charging mode that fully charges the battery of the electric vehicle, and a smart charging mode that restricts the charging capacity of the battery to improve the performance of the battery of the electric vehicle.

3. The charging apparatus of claim 2, wherein the charging control module set a combination of two or more charging modes.

4. The charging apparatus of claim 1, wherein when the present time reaches a charging time period, the charging control module ascertains the charging state of the battery of the electric vehicle, and when charging is possible, supplies charging power to the battery of the electric vehicle by controlling the charging switch.

5. The charging apparatus of claim 1, wherein the charging control module periodically checks the charging state of the battery of the electric vehicle in charging, and when the battery of the electric vehicle has been fully charged, completely charged, or in an unstable state, and the present time is the charging-end time, finishes the charging by turning off the charging switch.

6. The charging apparatus of claim 1, further comprising a charging power setting module that selects charging power that is supplied to the battery of the electric vehicle.

7. The charging apparatus of claim 6, wherein the charging power setting module provides the battery of the electric vehicle with charging power by selecting a charging power supplier in accordance with a charging fee input in accordance with a control signal of the charging control module.

8. The charging apparatus of claim 1, wherein the charging mode setting module receives a user's order for setting a charging limit time supplied to the battery of the vehicle.

9. The charging apparatus of claim 1, wherein the charging power supplier includes the charging power stored in the battery of an electric vehicle or a plug-in hybrid electric vehicle.

10. The charging apparatus of claim 1, further comprising a storing module that stores the power information, the information on the battery of the electric vehicle, and the charging mode information of the battery of the electric vehicle which is set by a user.

11. The charging apparatus of claim 1, wherein the power information includes at least any one of an energy source, the date, and power rates for time periods.

12. A charging method for a battery of an electric vehicle, comprising:
   a step of setting the charging amount for a battery of an electric vehicle by using power information received from a smart grid management center in a predetermined time range, a charging mode that a user sets, and information on the state of the battery;
   a step of calculating charging information by calculating at least one time period for charging the battery of the electric vehicle with the lowest charging power rate on the basis of charging power rates for unit time periods;
   a charging control step that provide charging power for inputting a control signal to a charging switch to charge the battery of the electric vehicle at the time period having the lowest charging power rate on the basis of the time period; and
   a connection step that connects the battery of the electric vehicle with power of a charging power supplier in accordance with the input control signal, by using the charging switch.

13. The method of claim 12, further comprising a step that sets a user's preferring charging mode from one of or a combination of an eco-charging mode that charges the battery of the electric vehicle at the charging time period having the lowest charging power rate within a predetermined time range, a fast charging mode that charges the battery of the electric vehicle by using high pressure within a short time, a full charging mode, and a smart charging mode that restricts the charging capacity of the battery to improve the performance of the battery of the electric vehicle, before the step of calculating.

14. The method of claim 12, further comprising:
   a step that determines whether the present time is a charging start time, and ascertains the state of the battery when the present time is the charging start time, and set charging power, if necessary, when charging is possible; and
   a step that turns on the charging switch to supply the charging power to the battery of the electric vehicle from the selected charging power.

15. The method of claim 12, further comprising a step of turning off the charging switch for supplying the charging power to the battery of the electric vehicle when the battery is fully charged, completely charged, or in an unstable state by periodically checking the state of the battery in charging, and when the present time is a charging-end time.

16. The method of claim 12, further comprising:
   a step of performing a process of ascertaining the identification number of the electric vehicle simultaneously with setting the start of charging of the battery of the electric vehicle; and
   a step of starting to charge the battery of the electric vehicle through a user identification process that ascertains the identification number of the electric vehicle.

17. The method of claim 12, further comprising a step of providing the battery of the electric vehicle with charging power by selecting a charging power supplier in accordance with a charging fee input in accordance with a control signal of the charging control module.

18. The method of claim 12, further comprising:
   a charging power selection step that supplies charging power from a plurality of charging power suppliers or sets charging power for supplying variable charging power using variable current and variable voltage;
   a charging power calculation step that sets charging information by calculating the optimum charging power and at least one time period for charging the battery of the electric vehicle with the lowest charging power rate on the basis of charging power rates for unit times acquired from power information within a predetermined time range;
   a charging control step that provides charging power for inputting a control signal to the charging switch and setting charging power to charge the battery of the electric vehicle at the time period having the lowest charging power rate on the basis of the time periods; and
   a connection step that connects the charging power with the battery of the electric vehicle in accordance with the input control signal by using the charging switch.

19. The method of claim 18, further comprising a variable charging power selection step that selects at least any one of the variable current and the variable voltage.

20. The method of claim 12, further comprising a step of setting the charging amount for the battery of the electric vehicle by receiving the charging mode from the electric vehicle.

* * * * *